(12) United States Patent
Chibon et al.

(10) Patent No.: US 11,425,211 B1
(45) Date of Patent: Aug. 23, 2022

(54) SIGNING FILES VIA A PUBLISH-SUBSCRIBE MESSAGE SERVICE

(71) Applicant: Red Hat, Inc., Raleigh, NC (US)

(72) Inventors: Pierre-Yves Chibon, Paris la Défense (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/242,984

(22) Filed: Apr. 28, 2021

(51) Int. Cl.
| | |
|---|---|
| *G06F 15/16* | (2006.01) |
| *H04L 67/55* | (2022.01) |
| *H04L 51/226* | (2022.01) |
| *G06F 9/54* | (2006.01) |
| *H04L 51/00* | (2022.01) |

(52) U.S. Cl.
CPC ............ *H04L 67/26* (2013.01); *G06F 9/546* (2013.01); *H04L 51/14* (2013.01); *H04L 51/26* (2013.01)

(58) Field of Classification Search
CPC ......... H04L 67/26; H04L 51/14; H04L 51/26; G06F 9/546
USPC ........................................................ 709/203
See application file for complete search history.

(56) References Cited

U.S. PATENT DOCUMENTS

| | | | |
|---|---|---|---|
| 8,205,087 B2 | 6/2012 | Gupta et al. | |
| 9,065,823 B2 | 6/2015 | Lu et al. | |
| 9,853,817 B2 | 12/2017 | LaGrone et al. | |
| 10,560,407 B2 * | 2/2020 | Bachmann | H04L 51/08 |
| 2005/0188203 A1 | 8/2005 | Bhaskaran et al. | |
| 2017/0063968 A1 * | 3/2017 | Kitchen | H04L 67/02 |
| 2018/0102996 A1 * | 4/2018 | Bachmann | H04L 51/08 |
| 2020/0259857 A1 | 8/2020 | Tora et al. | |
| 2021/0073430 A1 * | 3/2021 | Levy | G06N 20/00 |
| 2021/0073433 A1 * | 3/2021 | Austern | G06F 30/18 |
| 2021/0073434 A1 * | 3/2021 | Levy | G06F 30/27 |
| 2021/0073435 A1 * | 3/2021 | Segev | G06F 30/13 |
| 2021/0073440 A1 * | 3/2021 | Austern | G06F 30/12 |
| 2021/0073441 A1 * | 3/2021 | Austern | G06F 30/13 |
| 2021/0073442 A1 * | 3/2021 | Austern | G06V 10/44 |
| 2021/0073446 A1 * | 3/2021 | Levy | G06V 10/44 |
| 2021/0073447 A1 * | 3/2021 | Levy | G06Q 10/0875 |
| 2021/0073448 A1 * | 3/2021 | Segev | G06V 10/44 |

(Continued)

OTHER PUBLICATIONS

Copparapu, Raj, "Digital signing with the new asymmetric keys features of AWS KMS." https://aws.amazon.com/blogs/security/digital-signing-asymmetric-keys-aws-kms/, Nov. 25, 2019, 8 pages.

(Continued)

*Primary Examiner* — Alicia Baturay
(74) *Attorney, Agent, or Firm* — Dority & Manning, P.A.

(57) ABSTRACT

Provided herein are implementations to sign files via a publish-subscribe message service. In particular, a payload extractor receives, from a message broker via a publish-subscribe message service, a new file event. The message broker receives messages from publisher components and routes the messages to subscriber components based on content of the messages. The payload extractor extracts a payload of the new file and then sends, via the message broker, a signing request with the payload (and metadata) to a signing service. The signing service sends a signed notice with a signature (and metadata), via the message broker, to a signature inserter, which inserts the signature into the new file. Such a configuration provides a secure and scalable signing architecture with decreased network traffic.

20 Claims, 11 Drawing Sheets

(56) References Cited

U.S. PATENT DOCUMENTS

2021/0073449 A1\* 3/2021 Segev .................... G06N 5/025
2021/0334367 A1\* 10/2021 Chibon .................. G06F 21/57

OTHER PUBLICATIONS

Author Unknown, "Signatures—Rabbitmq", Rabbitmq.Com, https://www.rabbitmq.com/signatures.html, accessed Dec. 29, 2020, 5 pages.
Author Unknown, "The Signing Plugin". Docs.Gradle.Org, https://docs.gradle.org/current/userguide/signing_plugin.html, accessed Dec. 29, 2020, 10 pages.

\* cited by examiner

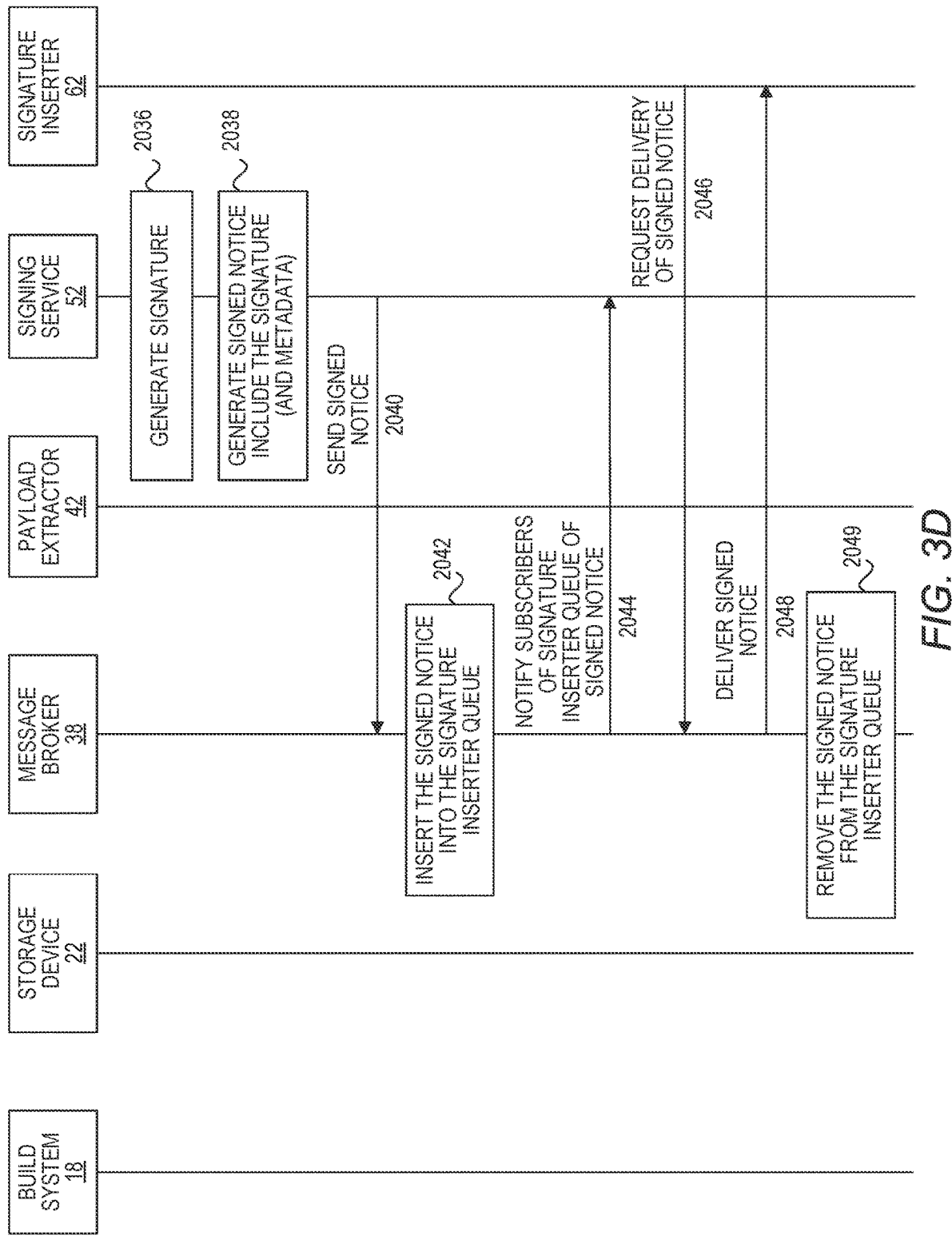

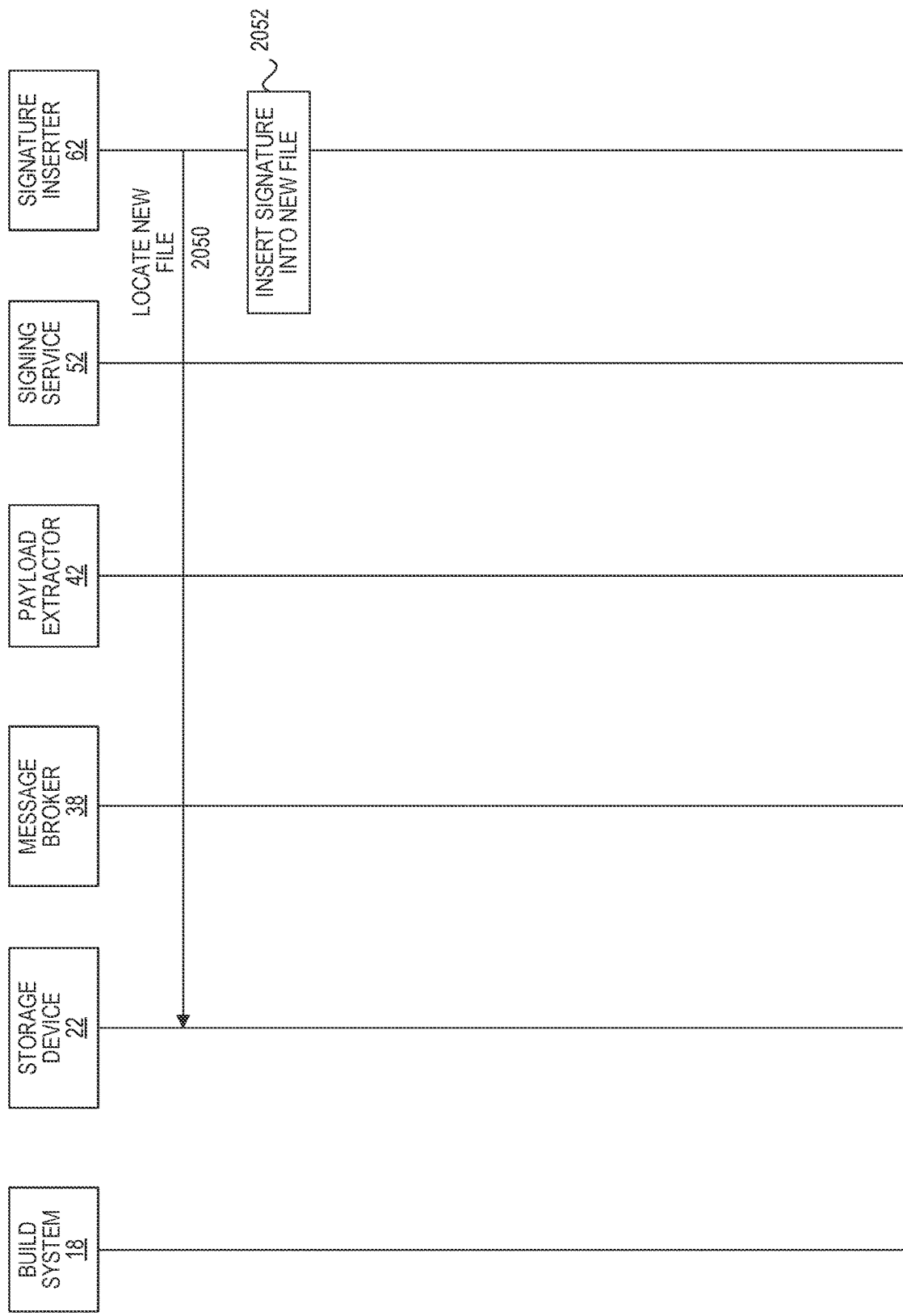

SIGNING FILES VIA A PUBLISH-SUBSCRIBE MESSAGE SERVICE

BACKGROUND

Signing new files is relied upon in computer security to verify software authenticity and integrity for secure distribution to end-users. Certain builds may require signing of thousands of files.

SUMMARY

The implementations disclosed herein provide signing files via a publish-subscribe message service. In particular, a payload extractor receives, from a message broker via a publish-subscribe message service, a new file event. The message broker receives messages from publisher components and routes the messages to subscriber components based on content of the messages. The payload extractor extracts a payload of the new file and then sends, via the message broker, a signing request with the payload (and metadata) to a signing service. The signing service sends a signed notice with a signature (and metadata), via the message broker to a signature inserter, which inserts the signature into the new file. Such a configuration provides a secure and scalable signing architecture with decreased network traffic.

In one implementation, a method is provided. The method includes receiving, by a processor device set comprising one or more processor devices, from a message broker via a message service, a first new file event comprising information that notifies a first new file has been generated. The message broker is configured to receive messages from a plurality of publisher components and route the messages to one or more subscriber components based on content of the messages. The method further includes extracting, by the processor device set, a payload of the first new file. The method further includes sending, by the processor device set to the message broker via the message service, a first signing request comprising the payload of the first new file and indicating that the first new file is to be signed by a signing service.

In another implementation, a computer system is provided. The computer system includes a processor device set comprising one or more processor devices of one or more computing devices. The processor device set is to receive from a message broker via a message service, a first new file event comprising information that notifies a first new file has been generated. The message broker is configured to receive messages from a plurality of publisher components and route the messages to one or more subscriber components based on content of the messages. The processor device set is further to extract a payload of the first new file. The processor device set is further to send to the message broker via the message service, a first signing request comprising the payload of the first new file and indicating that the first new file is to be signed by a signing service.

In another implementation, a computer system is provided. The computer system includes a processor device set comprising one or more processor devices of one or more computing devices. The processor device set is to receive, by a payload extractor from a message broker via a message service, a first new file event comprising information that notifies a first new file has been generated. The message broker is configured to receive messages from a plurality of publisher components and route the messages to one or more subscriber components based on content of the messages.

The processor device set is further to extract, by the payload extractor, a payload of the first new file. The processor device set is further to send, by the payload extractor to the message broker via the message service, a first signing request comprising the payload of the first new file and indicating that the first new file is to be signed by a signing service. The processor device set is further to receive by a signature inserter, a first signature from the message broker via the message service, the first signature corresponding to the payload of the first new file. The processor device set is further to inject, by the signature inserter, the first signature into the first new file.

Those skilled in the art will appreciate the scope of the disclosure and realize additional aspects thereof after reading the following detailed description of the implementations in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3D is a message sequence diagram illustrating example messages communicated between and actions taken by several of the elements illustrated in FIGS. 1A-1C to generate a signature for the payload;

FIG. 3E is a message sequence diagram illustrating example messages communicated between and actions taken by several of the elements illustrated in FIGS. 1A-1C to insert the signature into the new file;

DETAILED DESCRIPTION

Figure 1A:
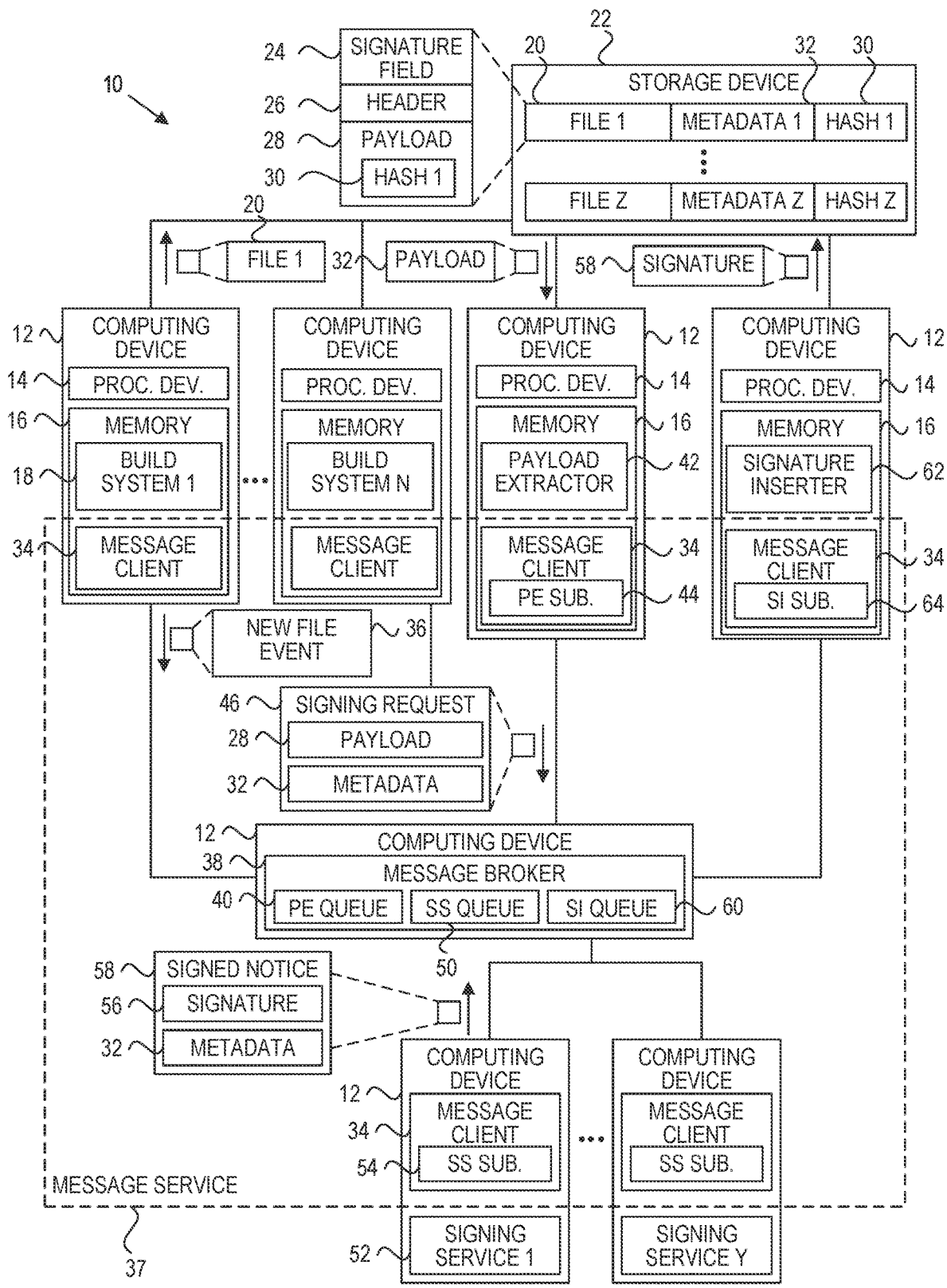
FIG. 1A is a block diagram of a system for signing files via a publish-subscribe message service illustrating certain aspects of various implementations disclosed herein.

The implementations set forth below represent the information to enable those skilled in the art to practice the implementations and illustrate the best mode of practicing the implementations. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the implementations are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The implementations disclosed herein provide signing files via a publish-subscribe message service. In particular, a payload extractor receives, from a message broker via a publish-subscribe message service, a new file event. The message broker receives messages from publisher components and routes the messages to subscriber components based on content of the messages. The payload extractor extracts a payload of the new file and then sends, via the message broker, a signing request with the payload (and metadata) to a signing service. The signing service sends a signed notice with a signature (and metadata), via the message broker to a signature inserter, which inserts the signature into the new file. Such a configuration provides a secure and scalable signing architecture with decreased network traffic.

Signing new files is relied upon in computer security to verify software authenticity and integrity for secure distribution to end-users. Certain builds may require signing of thousands of files. Due to security sensitivities, signing services are provided only on certain computing devices. Further, communication with such signing services must be secure to prevent breaches or attacks (e.g., man-in-the-middle attacks), otherwise, the security itself may be compromised.

Currently, some configurations utilize a tunneling protocol to allow secure communication with a signing service. For example, TLS (Transport Layer Security) tunneling encrypts all data sent over a TCP (Transmission Control Protocol) connection at the TCP sockets layer. Due to the nature of TLS tunneling, the signing service can only be in communication with a single computing device. Further, typically the entire new file is sent through the TLS tunnel to the signing service for signing. Once signed, the entire new file is then sent back through the TLS tunnel. For mass rebuilds, which may include thousands of files that each require signing, this process is slow and intensive. Further, such a configuration is not easily scalable.

The examples disclosed herein implement a scalable file signing mechanism with decreased network traffic. In particular, the examples utilize a publish-subscribe message service that provides secure communication with a plurality of signing services, which may be easily added and/or removed. A payload extractor extracts a payload of a new file and then sends, via a message broker of the publish-subscribe message service, a signing request with the payload (and metadata) to a signing service. The signing service sends a signed notice with a signature (and metadata), via the message broker to a signature inserter, which injects the signature into the new file. Sending only a portion of the new file and receiving only the signature decreases network traffic for a faster and more optimized process. Such a configuration provides a secure and scalable signing architecture with decreased network traffic.

FIG. 1A is a block diagram of a system 10 (may also be referred to as a computer system) for signing files via a publish-subscribe message service, illustrating certain aspects of various implementations disclosed herein. The system 10 includes a computing device 12, including a processor device 14 coupled to a memory 16. It is noted that for illustrative purposes to reduce space, only some of the computing devices 12 and other computer components are shown with a processor device 14 and a memory 16. However, each of the computing devices 12 and/or other computer components may include a processor device 14 and/or a memory 16. Further, each of the computing devices 12 may include a plurality of computing devices 12. Collectively, the processor devices 14 may be referred to as a processor device set 14.

The computer system 10 includes one or more build systems 18, each configured to create one or more new files 20. In certain implementations, the files 20 may comprise RPM (Red Hat Package Manager) files, ISO files, or the like. The files 20 may comprise artifacts such as executable files, data files, configuration files, or any other suitable file utilized by a software system. Although the system 10 is illustrated in the context of the build system 18, it is noted that the system 10 is not limited to signing files generated by a build system and has applicability in any application where it is desirable to sign one or more files with a digital signature.

The build system 18 generates a new file 20 and stores the new file 20 in a storage device 22. In certain implementations, the new file 20 includes a signature field 24. It may be desirable to digitally sign the new file 20 to verify software authenticity and ensure integrity for secure distribution to end-users. Certain builds may require signing of thousands of files 20. The new file 20 further includes a header 26 and payload 28. In certain implementations, the file 20 includes a hash 30 (may also be referred to as a hash value), which is a numeric value that uniquely identifies data. The hash 30 is used in data storage and retrieval applications to access data. As hashes 30 represent large amounts of data as much smaller values, hashes 30 are used with digital signatures because signing a hash value is more efficient than signing the larger value. Accordingly, the hash 30 may be associated with (e.g., attached to) the file 20 and/or stored within the payload 28. In certain implementations, the hash 30 within the file may be used to verify the hash 30 attached to the file.

Each file 20 further includes associated metadata 32. The metadata 32 is information about the file 20. In certain implementations, the metadata 32 may be used to summarize basic information about the file 20 to make finding and working with particular instances of the file 20 easier.

Once the file 20 is created and stored in the storage device 22, the build system 18 utilizes a message client 34 to communicate a new file event 36 to a message service 37 (may also be referred to herein as a publish-subscribe service, message bus, etc.). In certain embodiments, the message service 37 comprises an Advanced Messaging Queuing Protocol (AMQP) message service. A similar message client 34 is used by other components in communication with the message service 37.

In particular, the new file event 36 is transmitted to a message broker 38 of the message service 37. The message broker 38 facilitates communication between publisher components and subscriber components. The message broker 38 is configured to validate, store, route, and deliver messages to appropriate destinations based on attributes of the messages. In a publish-subscribe framework, subscriber components (i.e., receivers of messages) identify criteria of messages of interest to the subscriber components. The message broker 38 receives a message from a publisher component, analyzes the content of the message and/or metadata associated with the message with reference to the criteria identified by any subscriber components, and if the message matches any such criteria, forwards the message to the corresponding subscriber component(s). A component that interacts with the message broker 38 may be both publisher and a subscriber at different times, depending on whether the component is sending or receiving a message.

In certain implementations, message brokers 38 use message queues where messages are placed and stored until a subscriber retrieves the message. In certain implementations, message brokers 38 may use a pull model (e.g., Apache Kafka), where subscribers periodically check the queue for updates. In certain implementations, message brokers 38 use a push model (e.g., RabbitMQ), where the message broker 38 notifies subscribers of an update to the queue. Use of the message broker 38 ensures that the new file event 36 (and any other message) is delivered to only one subscriber. Such coordination prevents redundancies and potential conflicts.

The message broker 38 receives the new file event 36 and places the new file event 36 in a payload extractor queue 40. A payload extractor 42 with a payload extractor subscription 44 receives a notification (through either the pull model or the push model) that a new file event 36 has been added to the payload extractor queue 40. The new file event 36 includes information that notifies a new file 20 has been generated. In this situation, the payload extractor 42 is a subscriber component in the message service 37. The payload extractor 42 requests delivery from the message broker 38 for the new file event 36. The message broker 38 transmits the new file event 36 to the payload extractor 42 and removes the new file event 36 from the payload extractor queue 40. Accordingly, although there may be multiple build systems 18 and multiple payload extractors 42, the message broker 38 ensures delivery of the message to only one payload extractor 42.

The payload extractor 42 locates the file 20 and extracts the payload 28 from the new file 20 and obtains the metadata 32. In certain implementations, the payload 28 is only a portion of the file 20. For example, the payload extractor 42 may extract the payload 28 but not the contents of the signature field 24 or the header 26. In certain implementations, the payload extractor 42 accesses the metadata 32 so that the payload extractor 42 or another component can subsequently relocate the file 20. The payload extractor 42 generates a signing request 46, which includes the extracted payload 28 and the metadata 32, and transmits the signing request 46 to the message broker 38. In this situation, the payload extractor 42 is a publisher component in the message service 37. The signing request 46 is an indication that the new file 20 is to be signed by a signing service 52.

The message broker 38 receives the signing request 46 and places the signing request 46 in the signing service queue 50. In particular, the message broker 38 determines that the signing request 46 is to be sent to the signing service 52. The message broker 38 determines a signing service queue 50 from which the signing service 52 receives messages.

A signing service 52 with a signing service subscription 54 receives a notification (through either the pull model or the push model) that a signing request 46 has been added to the signing service queue 50. In this situation, the signing service 52 is a subscriber component in the message service 37. The signing request 46 requests delivery from the message broker 38 for the signing request 46. The message broker 38 transmits the signing request 46 to the signing service 52 and removes the signing request 46 from the signing service queue 50. Accordingly, although there may be multiple payload extractors 42 and/or multiple signing services 52, the message broker 38 ensures delivery of the message to only one signing service 52.

In certain implementations, to increase security, the signing service 52 is on an isolated server in network communication only with the message service 37. The signing service 52 receives signing requests 46 to sign only from the message service 37. In certain implementations, the signing service 52 is implemented on a server with hardware purposed for signing files. The message service 37 may provide security that is comparable (or better) than that of tunneling protocols. In particular, the message service 37 includes a standardized and centralized security model to authorize, authenticate, and audit use of the message service 37. Comparatively, tunneling protocols secure only communication ports with protocol-specific authentication and authorization (if any) and with no common way of auditing.

It is noted that due to the configuration of the message service 37, signing services 52 (and associated servers) can be relatively easily connected and disconnected from the message service 37. Accordingly, for example, signing services 52 can be added during mass rebuilds or other events requiring signing of large quantities of files and can be repurposed when fewer signing services 52 are needed.

The signing service 52 generates a signature 56 based on the payload 28. The signature 56 provides validation of authentication (the file 20 was created by a known sender) and integrity (the file 20 was not altered in transit). In certain implementations, the signature 56 is used with a PKI (Public Key Infrastructure) certificate utilized in asymmetric cryptography (e.g., using a public key and a private key). In certain implementations, the digital signature 56 includes a unique hash of the payload 28 encrypted with a private key.

The signing service 52 receives from the message broker 38 via the message service 37, the payload 28 of the new file 20 (and metadata 32 of the new file 20). The signing service 52 determines a signature 56 corresponding to the payload 28 of the new file 20. The signing service 52 generates a signed notice 58, which includes the signature 56 and the metadata 32. However, the signed notice 58 does not include the payload 28. The signature 56 is based on and corresponds to the payload 28. The signing service 52 transmits the signed notice 58 to the message broker 38 via the message service 37. In this situation, the signing service 52 is a publisher component in the message service 37.

The message broker 38 receives the signed notice 58 and places the signed notice 58 in the signature inserter queue 60. A signature inserter 62 with a signature inserter subscription 64 receives a notification (through either the pull model or the push model) that a signed notice 58 has been added to the signature inserter queue 60. The signature inserter 62 requests delivery from the message broker 38 for the signed notice 58. The message broker 38 transmits the signed notice 58 to the signature inserter 62 and removes the signed notice 58 from the signature inserter queue 60. Accordingly, although there may be multiple signing services 52 and/or multiple signature inserters 62, the message broker 38 ensures delivery of the message to only one signature inserter 62. The signature inserter 62 receives a signature 56 from the message broker 38 via the message service 37. The signature 56 corresponds to the payload 28 of the new file 20. The signature inserter 62 injects the signature 56 into the new file 20.

Although solely for purposes of illustration, the signature inserter 62 is illustrated as being implemented on a different computing device than that of the payload extractor 42, in other implementations, the payload extractor 42 and the signature inserter 62 may execute on a same computing device and may comprise a single component rather than two components.

The signature inserter 62 locates the file 20 in the storage device 22, such as by using the metadata 32. The signature inserter 62 injects the signature 56 into the new file 20. In particular, the signature inserter 62 then inserts the signature 56 into the signature field 24 of the file 20.

In certain implementations, the new file 20 comprises an RPM file, which includes a signature field 24, a header 26 (in a header field), and a payload 28 (in a payload field). The payload extractor 42 extracts only the payload 28 of the RPM file. The signature inserter 62 receives a signature 56 from the message broker 38 via the message service 37. The signature 56 corresponds to the payload 28 of the RPM file. The signature inserter 62 injects the signature 56 into the signature field 24 of the new file 20.

Although signing one file is illustrated above, the system 10 may sign any number of files. For example, in certain implementations, one or more build systems 18 may be involved in a mass rebuild where a large number of software packages are rebuilt. Doing so may require the signing of thousands of new files. As the system 10 is easily scalable, computing devices (e.g., servers) not otherwise involved in signing files may be temporarily repurposed to be in communication with the message service 37 to assist in signing the files. Further, transmitting only portions of the file (e.g., the payload 28 or the signature 56) reduces network volume resulting in improved system performance.

It is noted that, because the payload extractor 42 and the signature inserter 62 are components of corresponding computing devices 12, functionality implemented by the payload extractor 42 and the signature inserter 62 may be attributed to such computing devices 12 generally. Moreover, in examples where the payload extractor 42 and the signature inserter 62 comprise software instructions that program the processor devices 14 to carry out functionality discussed herein, functionality implemented by the payload extractor 42 and the signature inserter 62 may be attributed herein to the processor devices 14.

It is further noted that while the payload extractor 42 and the signature inserter 62 are shown as separate components, in other implementations, the payload extractor 42 and the signature inserter 62 could be implemented in a single component or could be implemented in a greater number of components than two.

Figure 1B:
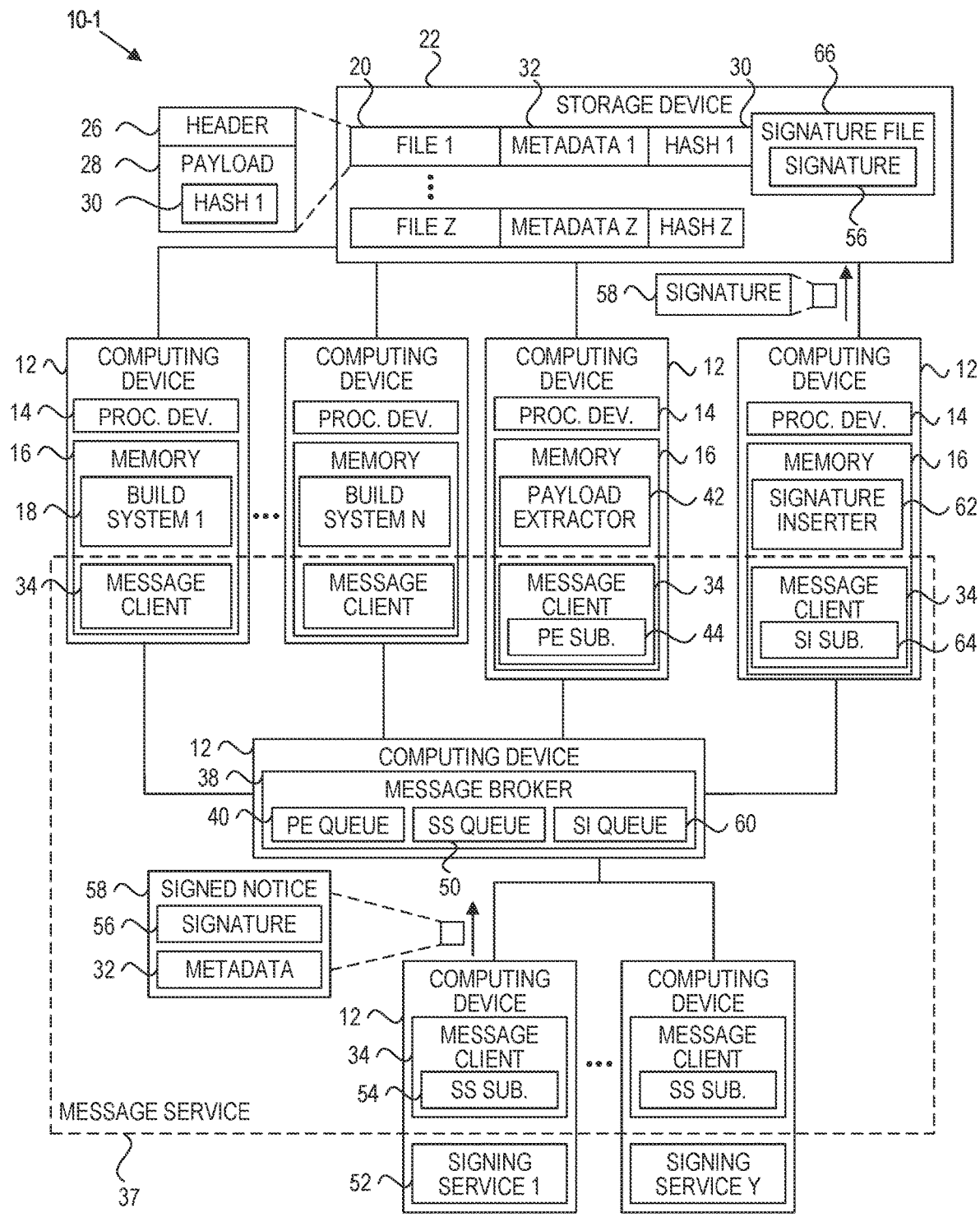
FIG. 1B is a block diagram of another implementation of the system of FIG. 1A illustrating the attachment of a signature to a file.

FIG. 1B is a block diagram of a system 10-1 illustrating the attachment of a signature to a file. The system 10-1 operates substantially similarly to the system 10 illustrated in FIG. 1A except as otherwise noted below. Certain features of FIG. 1A are omitted to save space for illustrative purposes only. In this implementation, the signature inserter 62, rather than injecting the signature 56 in the file 20, generates a signature file 66 including the signature 56. The signature inserter 62 associates the signature file 66 with the new file 20, such as via a naming convention, location of the signature file 66, or any other suitable convention or mechanism.

Figure 1C:
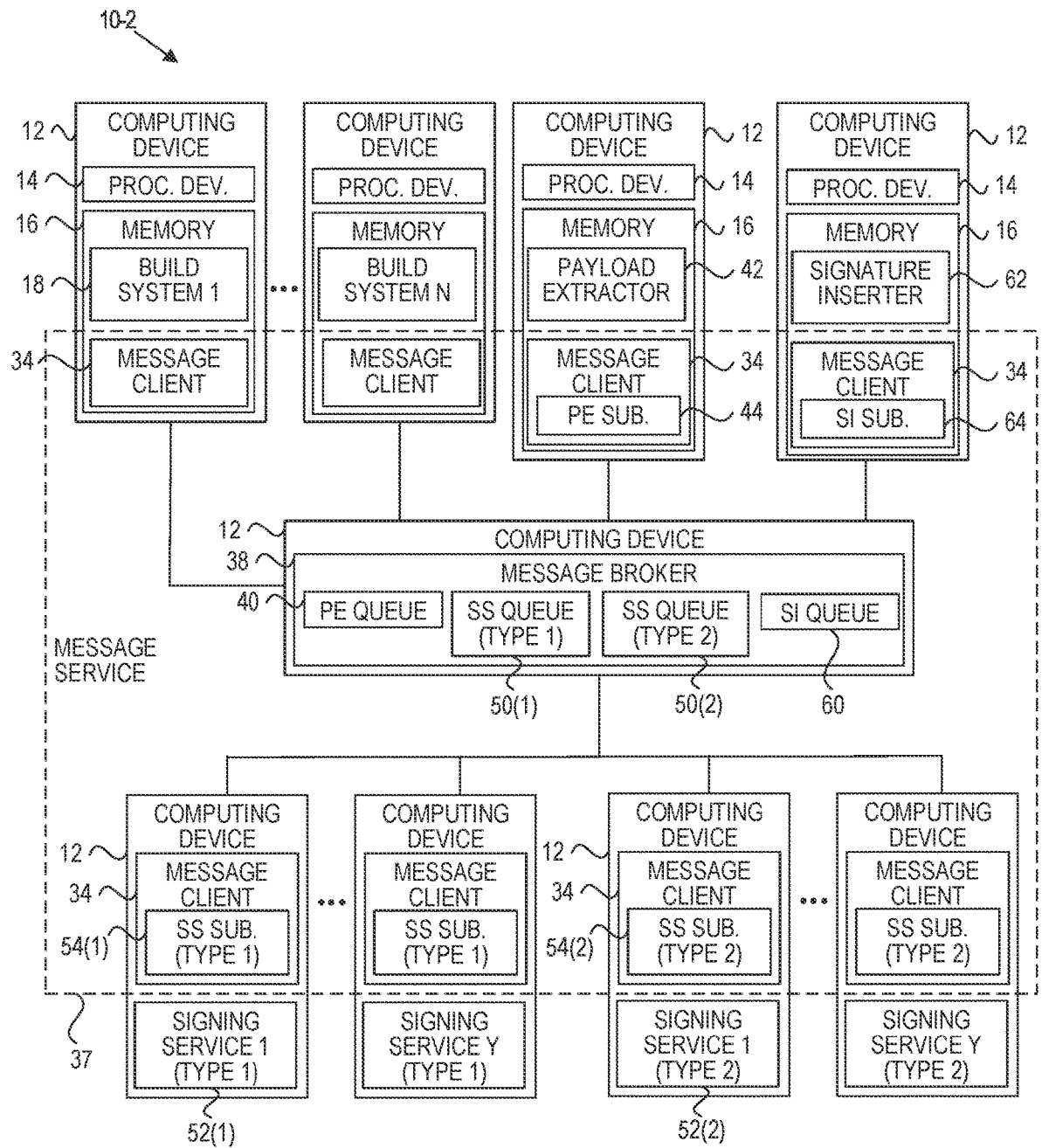
FIG. 1C is a block diagram of another implementation of the system of FIG. 1A illustrating a plurality of different types of signing services.

FIG. 1C is a block diagram of a system 10-2 illustrating a plurality of different types of signing services 52. The system 10-2 operates substantially similarly to the system 10 illustrated in FIG. 1A except as otherwise noted below. Certain features of FIG. 1A are omitted to save space for illustrative purposes only. In this implementation, the system 10-2 includes one or more of a first type of signing service 52(1) and one or more of a second type of signing service 52(2). As a result, the message broker 38 has a corresponding first type of signing signature queue 50(1) and a second type of signing signature queue 50(2). The message broker 38 sorts signing requests 46 depending on which type of signing service 52(1), 52(2) is required. As similarly noted above, any number of each type of signing service 52(1), 52(2) can be added or removed depending on the volume of signing requests 46 for each type of signing service 52(1), 52(2).

Each signing service 52(1) of a plurality of different signing services 52(1) of a first type of signing service 52(1) receives a message from a signing service queue 50(1) of a plurality of signing service queues 50(1), 50(2). Similarly, each signing service 52(2) of a plurality of different signing services 52(2) of a second type of signing service 52(2) receives a message from a signing service queue 50(2) of a plurality of signing service queues 50(1), 50(2).

For example, the message broker 38 determines that the signing request 46 is to be sent to a particular type of signing service 52(1) of a plurality of different types of signing services 52(1), 52(2). The message broker 38 determines a particular signing service queue 50(1) of the plurality of signing services queues 50(1), 50(2) from which the particular type of signing service 52(1) receives messages. The message broker 38 inserts the signing request 46 into the particular signing service queue 50(1). The message broker 38 receives a delivery request for delivery from a particular signing service 52(1) of the plurality of different signing services 52(1) and delivers the signing request 46 to the particular signing service 52(1) of the plurality of different signing services 52(1).

Figure 2:
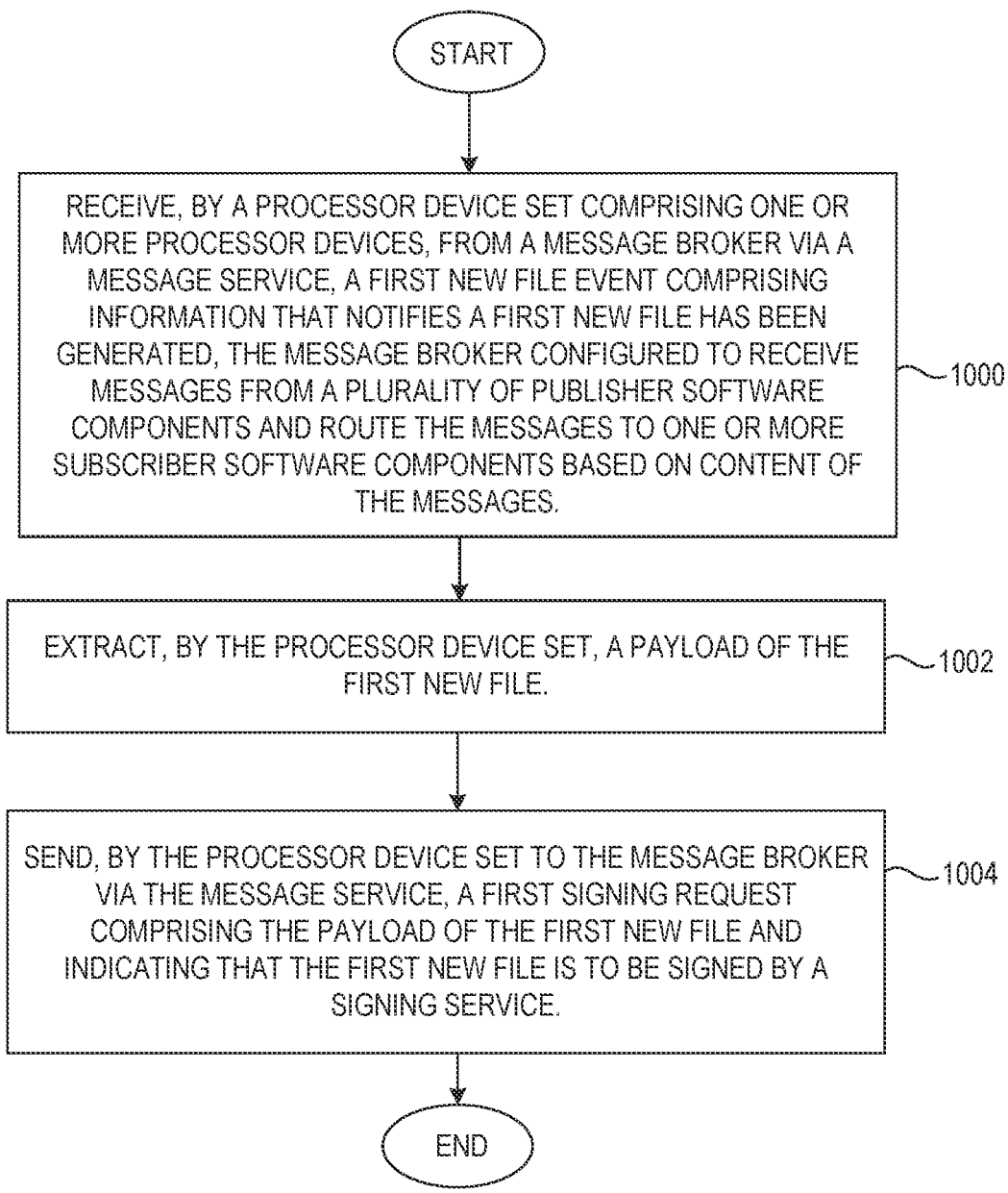
FIG. 2 is a flowchart illustrating processing steps for signing files via a publish-subscribe message service.

FIG. 2 is a flowchart illustrating a method for signing files via a publish-subscribe message service according to one implementation. FIG. 2 will be discussed in conjunction with FIG. 1A. A processor device set including one or more processor devices 14 receives from a message broker 38 via a message service 37, a first new file event 36 including information that notifies a first new file 20 has been generated. The message broker 38 is configured to receive messages from a plurality of publisher components and route the messages to one or more subscriber components based on content of the messages (block 1000).

The processor device set extracts a payload 28 of the first new file 20 (block 1002). The processor device set sends, to the message broker 38 via the message service 21, a first signing request 46 including the payload 28 of the first new file 20 and indicating that the first new file 20 is to be signed by a signing service 52 (block 1004).

Although a single signing request 46 is discussed, it is noted that the system 10 could be used for multiple signing requests 46 with multiple signing services 52. For example, in certain implementations, the payload extractor 42 receives from the message broker 38 via the message service 37 a second new file event 36 including information that notifies a second new file 20 has been generated. The payload extractor 42 extracts a payload 28 of the second new file 20. The payload extractor 42 sends to the message broker 38 via the message service 37, a second signing request 46 including the payload 28 of the second new file 20 and indicating that the second new file 20 is to be signed by a signing service 52. The message broker 38 determines that the second signing request 46 is to be sent to the signing service 52. The message broker 38 determines a signing service queue 50 from which the second signing service 52 receives messages and inserts the second signing request 46 into the signing service queue 50.

Figure 3A:
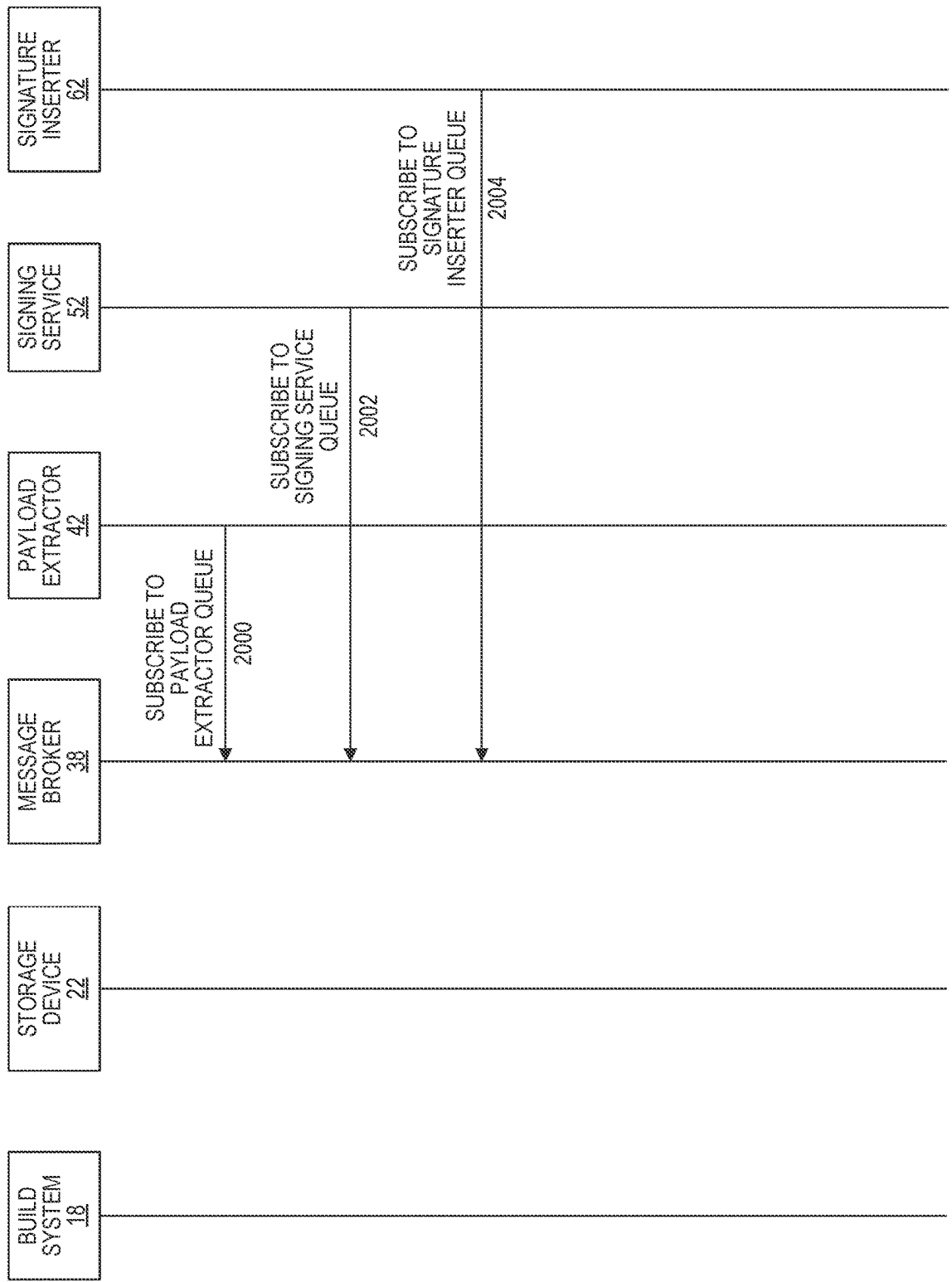
FIG. 3A is a message sequence diagram illustrating example messages communicated between and actions taken by several of the elements illustrated in FIGS. 1A-1C to subscribe to queues.

FIG. 3A is a message sequence diagram illustrating example messages communicated between and actions taken by several of the elements illustrated in FIGS. 1A-1C to subscribe to queues. The payload extractor 42 subscribes with the message broker 38 to a payload extractor queue 40 (2000). The signing service 52 subscribes with the message broker 38 to a signing service queue 50 (2002). The signature inserter 62 subscribes with the message broker 38 to a signature inserter queue 60 (2004). As noted above, in certain implementations, a pull model is used (e.g., Apache Kafka), where subscribers periodically check the queue 40, 50, 60 for updates. In certain implementations, a push model is used (e.g., RabbitMQ), where the message broker 38 notifies subscribers of an update to the queue 40, 50, 60. Use of the message broker 38 ensures that the new file event 36 (and any other message) is delivered to only one subscriber. Such coordination prevents redundancies and potential conflicts.

Figure 3B:
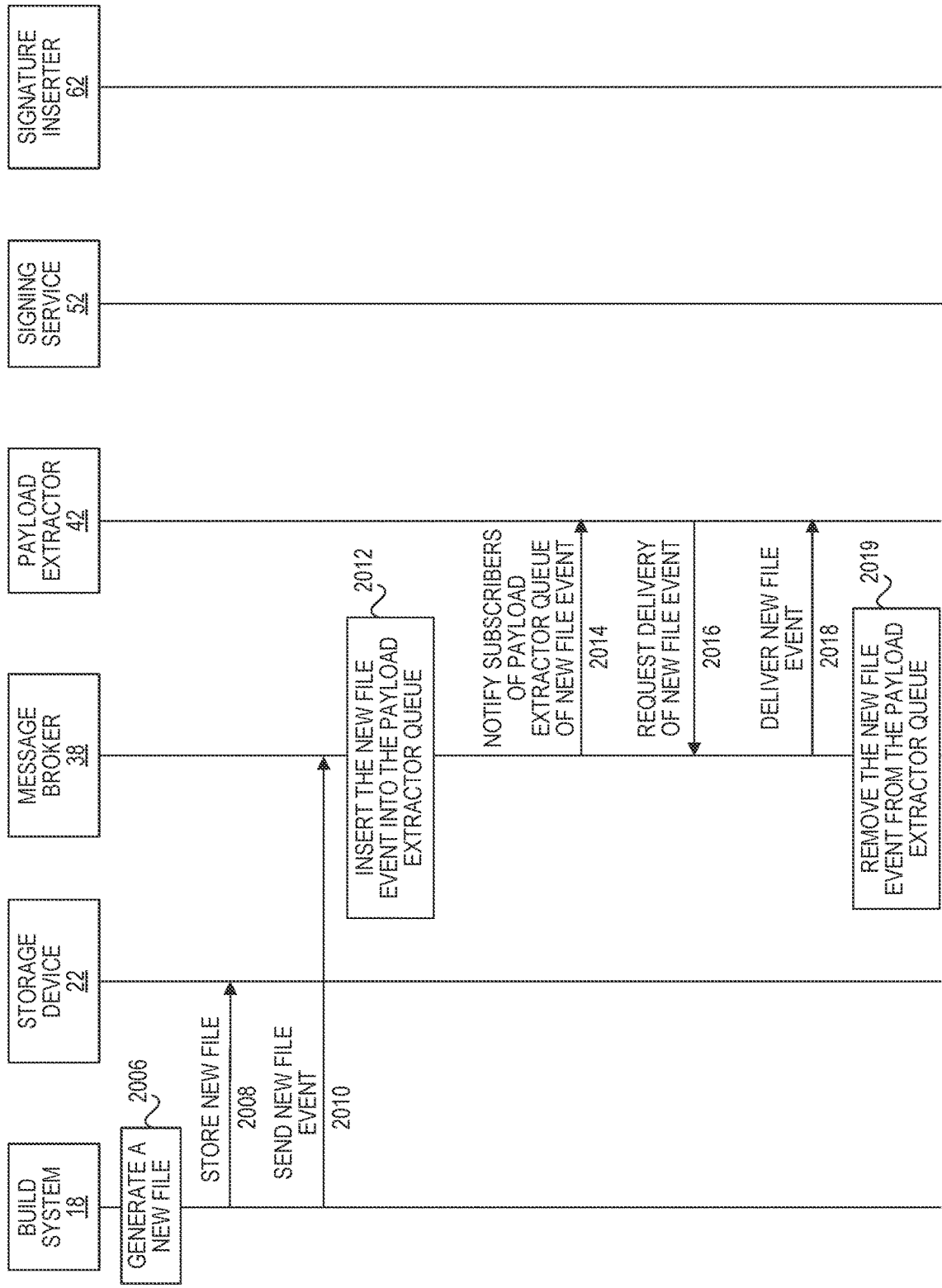
FIG. 3B is a message sequence diagram illustrating example messages communicated between and actions taken by several of the elements illustrated in FIGS. 1A-1C to generate a new file and transmit the new file to the payload extractor.

FIG. 3B is a message sequence diagram illustrating example messages communicated between and actions taken by several of the elements illustrated in FIGS. 1A-1C to generate a new file 20 and transmit to the payload extractor 42. The build system 18 generates a new file 20 (2006). The build system 18 stores the new file 20 in the storage device 22 (2008). The build system 18 then sends (i.e., publishes) a new file event 36 to the message broker 38 (2010). The message broker 38 then inserts the new file event 36 into the payload extractor queue 40 (2012). Doing so thereby notifies subscribers of the payload extractor queue 40 (including payload extractor 42) of the new file event 36, whether by the pull model or the push model (2014). The payload extractor 42 requests delivery of the new file event 36 (2016). The message broker 38 delivers the new file event 36 to the payload extractor 42 (2018). The message broker 38 then removes the new file event 36 from the payload extractor queue 40 (2019).

Figure 3C:
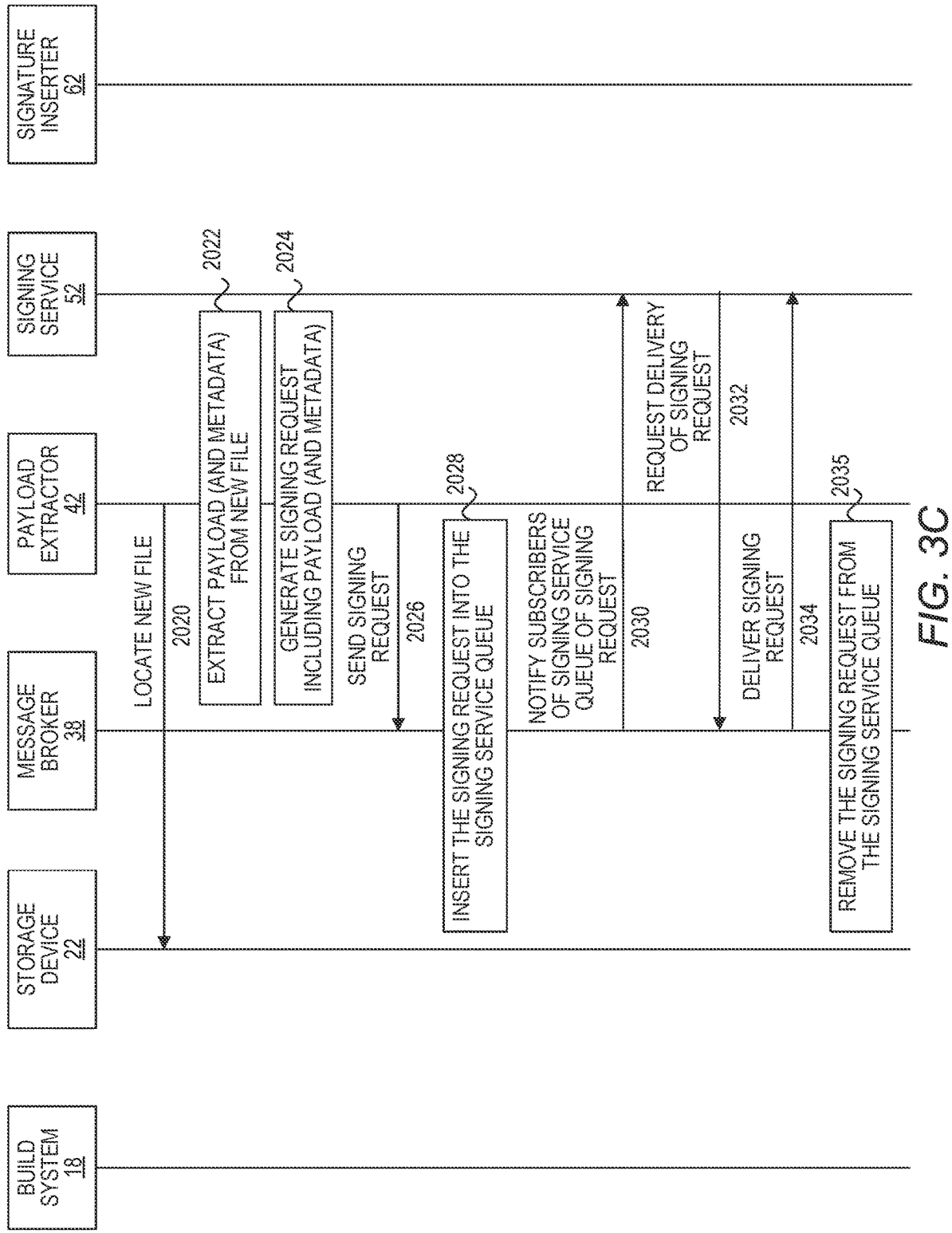
FIG. 3C is a message sequence diagram illustrating example messages communicated between and actions taken by several of the elements illustrated in FIGS. 1A-1C to extract a payload and request signing.

FIG. 3C is a message sequence diagram illustrating example messages communicated between and actions taken by several of the elements illustrated in FIGS. 1A-1C to extract a payload 28 and request signing. Upon receiving the new file event 36, the payload extractor 42 locates the new file 20 from the storage device 22 (2020). The payload extractor 42 then extracts the payload 28 (and metadata 32) from the new file 20 (2022). As noted above, in certain implementations, the payload 28 is only a part of the new file 20, and in other implementations, the payload 28 is the entire new file 20. The payload extractor 42 generates a signing request 46 including the payload 28 (and metadata 32) (2024). The payload extractor 42 sends (i.e., publishes) the signing request 46 to the message broker 38 (2026). The message broker 38 then inserts the signing request 46 into the signing service queue 50 (2028). Doing so thereby notifies subscribers of the signing service queue 50 (including signing service 52) of the signing request 46, whether by the pull model or the push model (2030). The signing service 52 requests delivery of the signing request 46 (2032). The message broker 38 delivers the signing request 46 to the signing service 52 (2034). The message broker 38 then removes the signing request 46 from the signing service queue 50 (2035).

FIG. 3D is a message sequence diagram illustrating example messages communicated between and actions taken by several of the elements illustrated in FIGS. 1A-1C to generate a signature 56 for the payload 28. Upon receiving the signing request 46, the signing service 52 generates a signature 56 based on the payload 28 (2036). The signing service 52 then generates a signed notice 58 including the signature 56 (and metadata 32) (2038). The signing service 52 sends (i.e., publishes) the signed notice 58 to the message broker 38 (2040). The message broker 38 then inserts the signed notice 58 into the signature inserter queue 60 (2042). Doing so thereby notifies subscribers of the signature inserter queue 60 (including signature inserter 62) of the signed notice 58, whether by the pull model or the push model (2044). The signature inserter 62 requests delivery of the signed notice 58 (2046). The message broker 38 delivers the signed notice 58 to the signature inserter 62 (2048). The message broker 38 then removes the signed notice 58 from the signature inserter queue 60 (2049).

FIG. 3E is a message sequence diagram illustrating example messages communicated between and actions taken by several of the elements illustrated in FIGS. 1A-1C to insert the signature into the new file. Upon receiving the signed notice 58, the signature inserter 62 locates the new file 20 in the storage device 22 (2050). Then the signature inserter 62 inserts the signature 56 into the new file 20 (2052).

Figure 4:
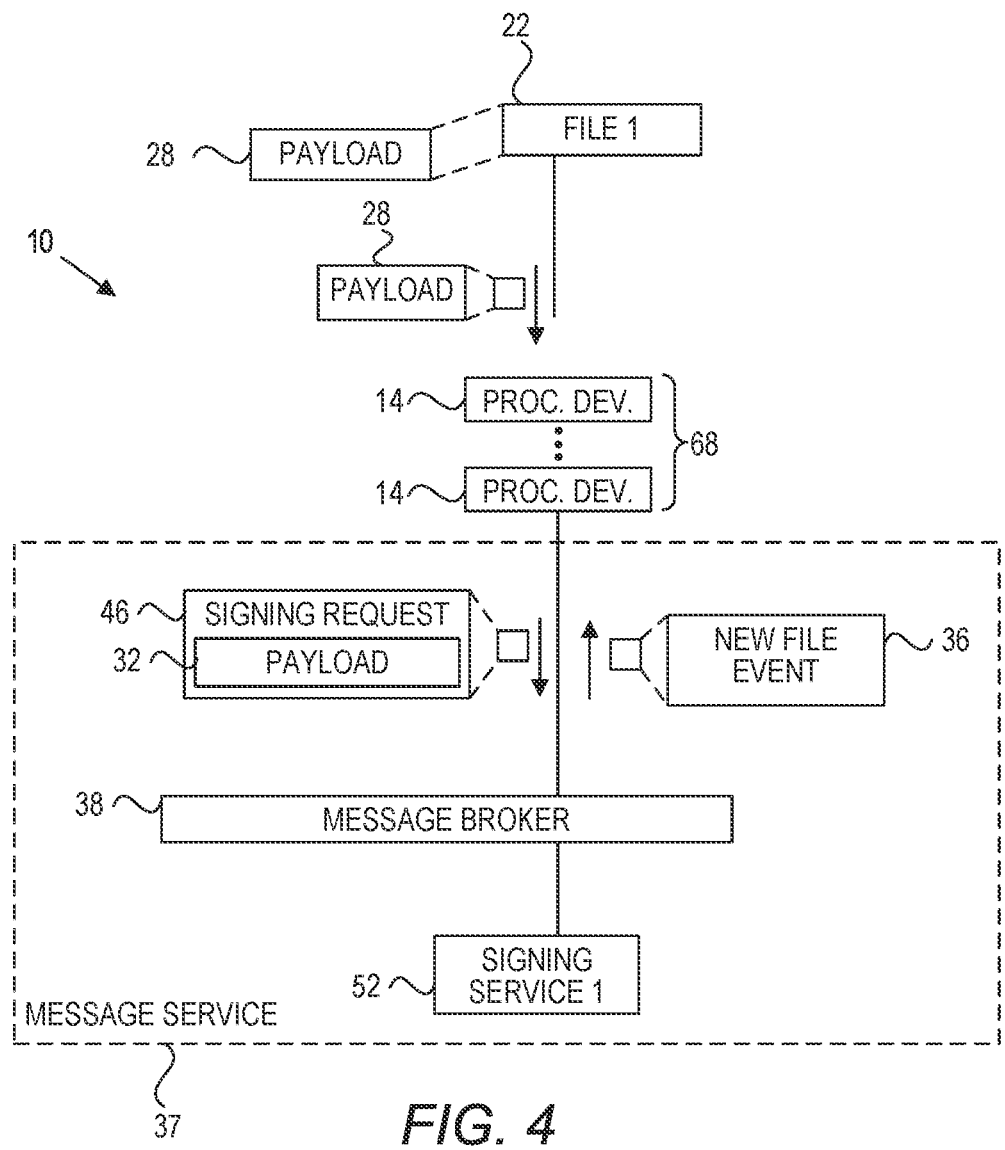
FIG. 4 is a simplified block diagram of the system illustrated in FIGS. 1A-1C according to another implementation.

FIG. 4 is a simplified block diagram of the system 10 illustrated in FIG. 1A according to another implementation. The system 10 includes a processor device set 68 including one or more processor devices 14. The processor device set 68 receives, from the message broker 38 via the message service 37, the first new file event 36 including information that notifies the first new file 20 has been generated. The message broker 38 is configured to receive messages from a plurality of publisher components and route the messages to one or more subscriber components based on content of the messages. The processor device set 68 extracts the payload 28 of the first new file 20. The processor device set sends, to the message broker 38 via the message service 37, the first signing request 46 including the payload 28 of the first new file 20 and indicating that the first new file 20 is to be signed by the signing service 52.

Figure 5:
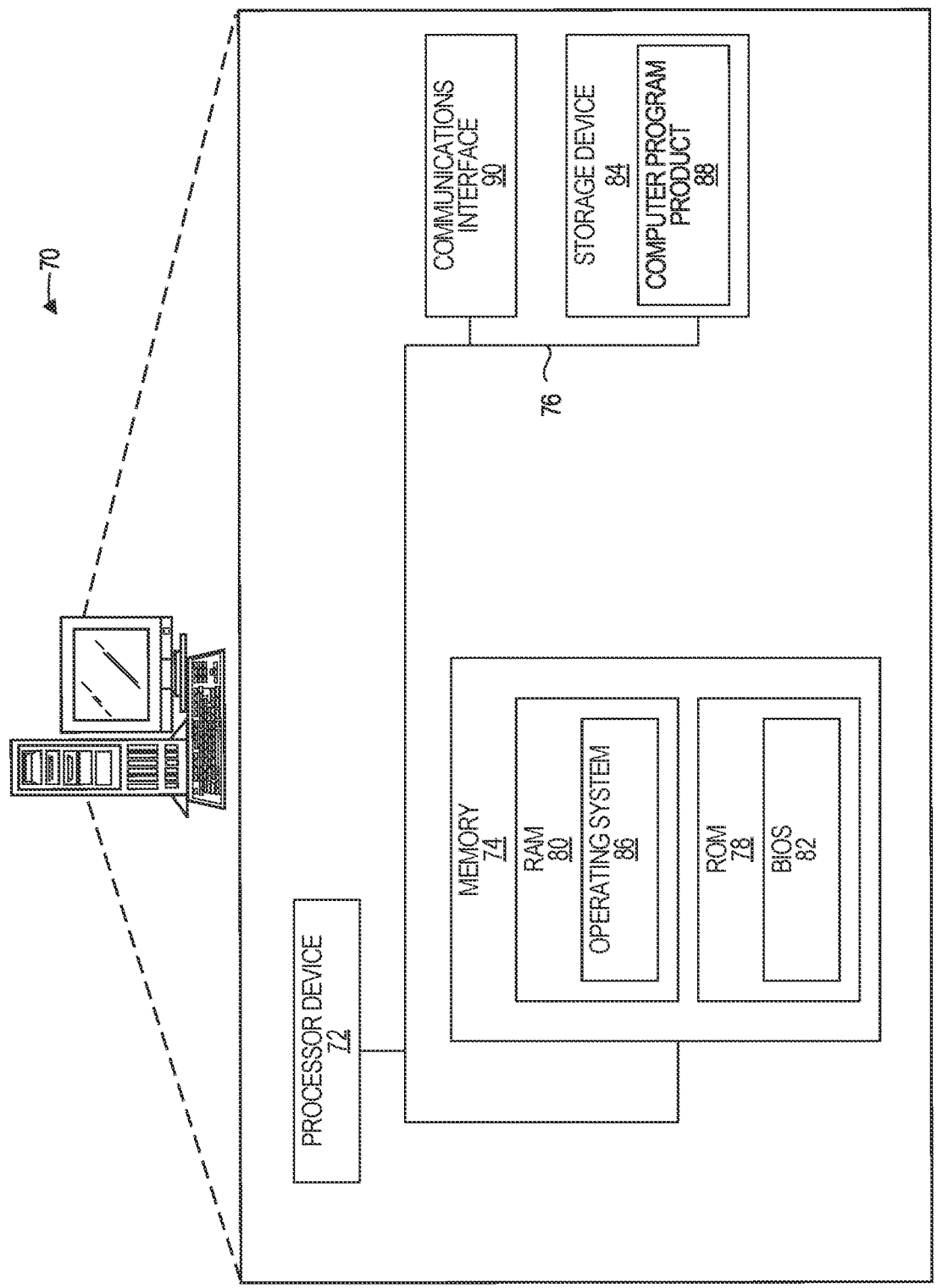
FIG. 5 is a block diagram of a computing device suitable for implementing one or more of the processing devices disclosed herein, according to one implementation.

FIG. 5 is a block diagram of a computing device 70 containing components suitable for implementing any of the processing devices disclosed herein. The computing device 70 includes a processor device 72, a system memory 74, and a system bus 76. The system bus 76 provides an interface for system components including, but not limited to, the system memory 74 and the processor device 72. The processor device 72 can be any commercially available or proprietary processor.

The system bus 76 may be any of several types of bus structures that may further interconnect to a memory bus (with or without a memory controller), a peripheral bus, and/or a local bus using any of a variety of commercially available bus architectures. The system memory 74 may include non-volatile memory 78 (e.g., read-only memory (ROM), erasable programmable read-only memory (EPROM), electrically erasable programmable read-only memory (EEPROM), etc.), and volatile memory 80 (e.g., random-access memory (RAM)). A basic input/output system (BIOS) 82 may be stored in the non-volatile memory 78 and can include the basic routines that help transfer information between elements within the computing device 70. The volatile memory 80 may also include a high-speed RAM, such as static RAM, for caching data.

The computing device 70 may further include or be coupled to a non-transitory computer-readable storage medium such as the storage device 84, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 84 and other drives associated with computer-readable media and computer-usable media may provide non-volatile storage of data, data structures, computer-executable instructions, and the like.

A number of modules can be stored in the storage device 84 and in the volatile memory 80, including an operating system 86 and one or more program modules, which may implement the functionality described herein in whole or in part. All or a portion of the examples may be implemented as a computer program product 88 stored on a transitory or non-transitory computer-usable or computer-readable storage medium, such as the storage device 84, which includes complex programming instructions, such as complex computer-readable program code, to cause the processor device 72 to carry out the steps described herein. Thus, the computer-readable program code can comprise software instructions for implementing the functionality of the examples described herein when executed on the processor device 72. The processor device 72, in conjunction with the network manager in the volatile memory 80, may serve as a controller or control system for the computing device 70 that is to implement the functionality described herein.

The computing device 70 may also include one or more communication interfaces 90, depending on the particular functionality of the computing device 70. The communication interfaces 90 may comprise one or more wired Ethernet transceivers, wireless transceivers, fiber, satellite, and/or coaxial interfaces by way of non-limiting examples.

Those skilled in the art will recognize improvements and modifications to the preferred implementations of the disclosure. All such improvements and modifications are considered within the scope of the concepts disclosed herein and the claims that follow.

What is claimed is:

1. A method, comprising:
   receiving, by a processor device set comprising one or more processor devices, from a message broker via a message service, a first new file event comprising information that notifies a first new file has been generated, the message broker is configured to receive messages from a plurality of publisher components and route the messages to one or more subscriber components based on content of the messages;
   extracting, by the processor device set, a payload of the first new file; and
   sending, by the processor device set to the message broker via the message service, a first signing request comprising the payload of the first new file and indicating that the first new file is to be signed by a signing service.

2. The method of claim 1, further comprising:
   prior to receiving the first new file event, connecting, by the processor device set, to the message broker; and
   subscribing to a payload extractor queue implemented by the message broker;
   wherein receiving the first new file event comprises receiving the first new file event via the payload extractor queue.

3. The method of claim 2 further comprising:
   determining, by the message broker, that the first signing request is to be sent to one of a plurality of signing services;
   determining a signing service queue from which the plurality of signing services receive messages; and
   inserting the first signing request into the signing service queue.

4. The method of claim 2, wherein the signing service is a particular signing service of a plurality of different signing services, each signing service to receive a message from a signing service queue of a plurality of signing service queues, and further comprising:
   determining, by the message broker, that the first signing request is to be sent to a particular type of signing service of a plurality of different types of signing services;
   determining a particular signing service queue of the plurality of signing services queues from which the particular type of signing service receives messages;
   inserting the first signing request into the particular signing service queue;
   receiving a delivery request for delivery from the particular signing service of the plurality of different signing services; and
   delivering the first signing request to the particular signing service of the plurality of different signing services.

5. The method of claim 2, wherein the message service comprises an Advanced Messaging Queuing Protocol (AMQP).

6. The method of claim 1, further comprising:
   receiving, by the signing service from the message broker via the message service, the payload of the first new file;
   determining, by the signing service, a first signature corresponding to the payload of the first new file; and
   sending, by the signing service to the message broker via the message service, a first signed notice comprising the first signature and devoid of the payload of the first new file.

7. The method of claim 1, further comprising:
   receiving, by the signing service from the message broker via the message service, the first signing request comprising the payload of the first new file and metadata of the first new file;
   determining, by the signing service, a first signature corresponding to the payload of the first new file; and
   sending, by the signing service to the message broker via the message service, a first signed notice comprising the first signature and the metadata of the first new file.

8. The method of claim 1, wherein the signing service receives signing requests to sign only from the message service.

9. The method of claim 1, further comprising:
   receiving, by the processor device set, a first signature from the message broker via the message service, the first signature corresponding to the payload of the first new file; and
   injecting, by the processor device set, the first signature into the first new file.

10. The method of claim 1, further comprising:
receiving, by the processor device set, a first signature from the message broker via the message service, the first signature corresponding to the payload of the first new file;
generating, by the processor device set, a first signature file comprising the first signature and devoid of the payload of the first new file; and
associating, by the processor device set, the first signature file with the first new file.

11. The method of claim 1,
wherein the first new file comprises a Red Hat Package Manager (RPM) file comprising a signature field, a header, and a payload; and
wherein extracting, by the processor device set, the payload of the first new file comprises extracting, by the processor device set, only the payload of the RPM file.

12. The method of claim 11, further comprising:
receiving, by the processor device set, a first signature from the message broker via the message service, the first signature corresponding to the payload of the first new file; and
injecting, by the processor device set, the first signature into the signature field of the RPM file.

13. The method of claim 1, further comprising:
receiving, by the processor device set from the message broker via the message service, a second new file event comprising information that notifies a second new file has been generated;
extracting, by the processor device set, a payload of the second new file; and
sending, by the processor device set to the message broker via the message service, a second signing request comprising the payload of the second new file and indicating that the second new file is to be signed by a signing service.

14. The method of claim 13, further comprising:
determining, by the message broker, that the second signing request is to be sent to the signing service;
determining a signing service queue from which the second signing service receives messages; and
inserting the second signing request into the signing service queue.

15. A computer system comprising a processor device set comprising one or more processor devices of one or more computing devices, the processor device set to:
receive from a message broker via a message service, a first new file event comprising information that notifies a first new file has been generated, the message broker is configured to receive messages from a plurality of publisher components and route the messages to one or more subscriber components based on content of the messages;
extract a payload of the first new file; and
send to the message broker, via the message service, a first signing request comprising the payload of the first new file and indicating that the first new file is to be signed by a signing service.

16. The computer system of claim 15, wherein the processor device set is further to:
determine, by the message broker, that the first signing request is to be sent to the signing service;
determine a signing service queue from which the first signing service receives messages; and
insert the first signing request into the signing service queue.

17. The computer system of claim 15, wherein the processor device set is further to:
receive, by the signing service from the message broker via the message service, the payload of the first new file;
determine, by the signing service, a first signature corresponding to the payload of the first new file; and
send, by the signing service to the message broker via the message service, a first signed notice comprising the first signature.

18. The computer system of claim 15, wherein the processor device set is further to:
receive, by the processor device set, a first signature from the message broker via the message service, the first signature corresponding to the payload of the first new file; and
inject, by the processor device set, the first signature into the first new file.

19. A computer system comprising a processor device set comprising one or more processor devices of one or more computing devices, the processor device set to:
receive, by a payload extractor from a message broker via a message service, a first new file event comprising information that notifies a first new file has been generated, the message broker is configured to receive messages from a plurality of publisher components and route the messages to one or more subscriber components based on content of the messages;
extract, by the payload extractor, a payload of the first new file; and
send, by the payload extractor to the message broker via the message service, a first signing request comprising the payload of the first new file and indicating that the first new file is to be signed by a signing service;
receive, by a signature inserter, a first signature from the message broker via the message service, the first signature corresponding to the payload of the first new file; and
inject, by the signature inserter, the first signature into the first new file.

20. The computer system of claim 19, wherein the processor device set is further to:
receive, by the signing service from the message broker via the message service, the payload of the first new file;
generate, by the signing service, a first signature corresponding to the payload of the first new file; and
send, by the signing service to the message broker via the message service, a first signed notice comprising the first signature.

* * * * *